United States Patent
Omoto et al.

(10) Patent No.: US 11,655,365 B2
(45) Date of Patent: *May 23, 2023

(54) POLYURETHANE FOAM

(71) Applicant: INOAC CORPORATION, Nagoya (JP)

(72) Inventors: Mitsuru Omoto, Anjo (JP); Tomotaka Hara, Anjo (JP); Satoshi Takayama, Anjo (JP); Takanobu Hara, Anjo (JP)

(73) Assignee: INOAC CORPORATION, Nagoya (JP)

( * ) Notice: Subject to any disclaimer, the term of this patent is extended or adjusted under 35 U.S.C. 154(b) by 30 days.

This patent is subject to a terminal disclaimer.

(21) Appl. No.: 17/353,147

(22) Filed: Jun. 21, 2021

(65) Prior Publication Data

US 2021/0309853 A1    Oct. 7, 2021

Related U.S. Application Data

(63) Continuation of application No. 15/559,640, filed as application No. PCT/JP2015/082780 on Nov. 20, 2015, now Pat. No. 11,072,704.

(30) Foreign Application Priority Data

Mar. 20, 2015  (JP) ................................. 2015-057921
Jun. 30, 2015  (JP) ................................. 2015-130667

(51) Int. Cl.

| C08G 18/42 | (2006.01) |
| C08L 75/06 | (2006.01) |
| C08K 5/3492 | (2006.01) |
| C08G 18/76 | (2006.01) |
| C08G 18/20 | (2006.01) |
| C08G 18/48 | (2006.01) |
| C08G 18/40 | (2006.01) |
| C08K 5/49 | (2006.01) |
| C08K 3/04 | (2006.01) |
| C08J 9/12 | (2006.01) |

(52) U.S. Cl.
CPC .......... *C08L 75/06* (2013.01); *C08G 18/2081* (2013.01); *C08G 18/4018* (2013.01); *C08G 18/4241* (2013.01); *C08G 18/4837* (2013.01); *C08G 18/7607* (2013.01); *C08G 18/7621* (2013.01); *C08G 18/7664* (2013.01); *C08J 9/12* (2013.01); *C08K 3/04* (2013.01); *C08K 5/34922* (2013.01); *C08K 5/49* (2013.01); *C08G 2110/0008* (2021.01); *C08G 2110/0058* (2021.01); *C08G 2110/0083* (2021.01); *C08G 2170/20* (2013.01); *C08G 2350/00* (2013.01)

(58) Field of Classification Search
CPC ............ C08G 18/2081; C08G 18/4018; C08G 18/4241; C08G 18/4837; C08G 18/7607; C08G 18/7621; C08G 18/7664; C08G 2110/0008; C08G 2110/0058; C08G 2110/0083; C08G 2170/20; C08G 2350/00; C08J 9/12; C08K 3/04; C08K 5/34922; C08K 5/49; C08L 75/06
See application file for complete search history.

(56) References Cited

U.S. PATENT DOCUMENTS

| 3,645,924 A | 2/1972 | Fogiel |
| 3,931,065 A | 1/1976 | Ashida et al. |
| 4,508,774 A | 4/1985 | Grabhoefer et al. |
| 4,576,974 A | 3/1986 | Carroll et al. |
| 4,897,431 A | 1/1990 | Scherzer et al. |
| 5,900,441 A * | 5/1999 | De Witte ............... C08G 18/10 521/170 |
| 11,072,704 B2 * | 7/2021 | Omoto ............... C08G 18/4018 |
| 2004/0220290 A1 * | 11/2004 | Grimm ................. C08J 9/127 521/170 |
| 2007/0142489 A1 | 6/2007 | Sawai |
| 2013/0043438 A1 | 2/2013 | Moss et al. |
| 2015/0080276 A1 | 3/2015 | Hansel et al. |

FOREIGN PATENT DOCUMENTS

| CN | 101987884 A | 3/2011 |
| CN | 103619898 A | 3/2014 |
| GB | 1404822 A | 9/1975 |
| JP | 59-206428 A | 11/1984 |
| JP | 8-73553 A | 3/1996 |
| JP | 11-140150 A | 5/1999 |
| JP | 2003-246829 A | 9/2003 |
| JP | 2004-51693 A | 2/2004 |
| JP | 2006-233021 A | 9/2006 |
| JP | 2009-280658 A | 12/2009 |

(Continued)

OTHER PUBLICATIONS

Communication dated Feb. 26, 2018 by the Japanese Patent Office in Japanese Patent Application No. 2014-104907.
Luo, Wei et al., "Study of different-sized sulfur-free expandable graphite on morphology and properties of water-blown semi-rigid polyurethane foams", RSC Advances, Jul. 31, 2014, Vo. 4, No. 70, pp. 37302-37310. (39 pages total).
Communication dated Sep. 28, 2018, issued by the Japanese Patent Office in Japanese Patent Application No. 2014-104907.
Communication dated Jan. 4, 2019, issued by the Japanese Patent Office in Japanese Application No. 2015-130667.
Communication dated Aug. 2, 2018, issued by the European Patent Office in European Patent Application No. 15886494.2.

(Continued)

*Primary Examiner* — John M Cooney
(74) *Attorney, Agent, or Firm* — Sughrue Mion, PLLC

(57) ABSTRACT

Provided is a polyurethane foam having excellent heat resistance and the like. The polyurethane foam is obtained from a material that contains a polyol and a polyisocyanate, in which the polyol contains a polyester polyol, the polyisocyanate contains a diphenylmethane diisocyanate-based isocyanate, it is preferable that the polyester polyol has one or more side chains composed of an alkyl group, and the polyurethane foam may be used as a soundproof material for vehicles.

9 Claims, No Drawings

(56) References Cited

FOREIGN PATENT DOCUMENTS

| | | |
|---|---|---|
| JP | 2011-16854 A | 1/2011 |
| JP | 2015-504112 A | 2/2015 |
| JP | 2015-218319 A | 12/2015 |
| WO | 2012/163279 A1 | 12/2012 |

OTHER PUBLICATIONS

Written Opinion dated Feb. 2, 2016, issued by the International Searching Authority in International Patent Application No. PCT/JP2015/082780 (PCT/ISA/237).

Search Report dated Feb. 2, 2016, issued by the International Searching Authority in International Patent Application No. PCT/JP2015/082780 (PCT/ISA/210).

\* cited by examiner

POLYURETHANE FOAM

CROSS-REFERENCE TO RELATED APPLICATIONS

This application is a Continuation of U.S. application Ser. No. 15/559,640 filed Sep. 19, 2017, which is a National Stage of International Application No. PCT/JP2015/082780 filed Nov. 20, 2015, claiming priority to Japanese Patent Application No. 2015-057921 filed Mar. 20, 2015, and to Japanese Patent Application No. 2015-130667 filed Jun. 30, 2015, the entire contents of these applications being hereby incorporated by reference.

TECHNICAL FIELD

The present invention relates to a polyurethane foam, and particularly it relates to a polyurethane foam having excellent heat resistance, and further a polyurethane foam having good heat resistance and moist heat resistance and excellent flame retardancy.

BACKGROUND ART

A polyurethane foam has been used also as a soundproof material but a common polyurethane foam, particularly an ether-based polyurethane foam is easily oxidized and degraded and has bad heat resistance, so that it is not suitable in some use places. For example, in vehicles, in order to suppress noise, soundproof materials are used at various sites but, in the case of the use in the vicinity of engine, heat resistance is required.

As those having increased heat resistance and flame retardancy of polyurethane foams, there are a polyurethane foam impregnated with asphalt (Patent Document 1), an isocyanurate foam (Patent Document 2), and a polycarbonate-based polyurethane foam (Patent Document 3).

The polyurethane foam impregnated with asphalt is produced by injecting a composition composed of a polyol, a polyisocyanate, a catalyst, a flame retardant, a foaming agent, asphalt, and the like into a mold and subjecting the composition to foam molding.

The isocyanurate foam is a foam containing an isocyanurate ring that is a trimer of an isocyanate. Since the isocyanurate ring has high stability in the bond as compared with a urethane bond, heat resistance and flame retardancy are excellent.

The polycarbonate-based polyurethane foam is a polyurethane foam that uses a polycarbonate polyol having a polycarbonate group in a main chain thereof and has excellent heat resistance and hydrolysis resistance as compared with common ether-based polyurethane foams and ester-based polyurethane foams.

However, the polyurethane foam impregnated with asphalt becomes heavy due to the asphalt used for impregnation and also becomes easily combustible and there is a problem of generation of stickiness at high temperature.

On the other hand, since the isocyanurate foam contains a large amount of an isocyanurate during the blending of a polyurethane foam, the foam is prone to be brittle and the hardness of the foam increases, so that the isocyanurate foam is not suitable as a soundproof material or the like for vehicles.

Further, with regard to the polycarbonate-based polyurethane foam, since the viscosity of a raw material thereof is extremely high, there are problems that handling during production is troublesome, low-temperature characteristics are poor, and the raw material costs high.

Incidentally, a polyurethane foam using a melamine flame retardant as a flame retardant has been proposed but there is a problem that an effect of improving flame retardancy is not so high even when its adding amount is increased.

BACKGROUND ART DOCUMENTS

Patent Documents

Patent Document 1: JP-B-61-50965
Patent Document 2: JP-A-9-195415
Patent Document 3: JP-A-2005-60643

SUMMARY OF THE INVENTION

Problems that the Invention is to Solve

The present invention has been devised in consideration of the above points and includes a first invention and a second invention. The first invention has an object to provide a polyurethane foam that has excellent heat resistance and good foam strength and is lightweight, easy to handle, and inexpensive.

Further, the second invention has an object to provide a polyurethane foam having good heat resistance, moist heat resistance, and flame retardancy.

Means for Solving the Problems

The first invention includes the invention described in each of items 1 to 3.

The invention of item 1 is a polyurethane foam obtained by reacting a polyol and a polyisocyanate, wherein the polyol contains a polyester polyol having one or more side chains composed of an alkyl group, and the polyisocyanate contains a diphenylmethane diisocyanate.

The invention of item 2 is the polyurethane foam according to item 1, wherein the polyol contains a polyester polyol having one or more side chains composed of an alkyl group and a polyether polyol in a mass ratio of from 100:0 to 30:70.

The invention of item 3 is the polyurethane foam according to item 1 or 2, wherein the polyisocyanate contains diphenylmethane diisocyanate and tolylene diisocyanate in a mass ratio of from 100:0 to 30:70.

The second invention includes the invention described in each of items 4 to 8.

The invention of item 4 is a polyurethane foam obtained from a polyurethane foaming raw material containing a polyol, a polyisocyanate, a foaming agent, a catalyst, and a flame retardant, wherein the polyol contains a polyester polyol, the polyisocyanate is a diphenylmethane diisocyanate-based isocyanate, the flame retardant is composed of any one or both of powder flame retardants of expanded graphite and a phosphorus-based powder flame retardant and the adding amount is 20 parts by mass or more per 100 parts by mass of the polyol, and the polyurethane foam has a density (JIS K7222:2005) of from 80 to 120 kg/m$^3$.

The invention of item 5 is the polyurethane foam according to item 4, wherein the polyester polyol has one or more side chains composed of an alkyl group.

The invention of item 6 is the polyurethane foam according to item 4 or 5, wherein the polyol contains a polyester polyol having one or more side chains composed of an alkyl group and a polyether polyol.

The invention of item 7 is the polyurethane foam according to any one of items 4 to 6, wherein the adding amount of the flame retardant is from 20 to 40 parts by mass per 100 parts by mass of the polyol.

The invention of item 8 is the polyurethane foam according to any one of items 4 to 7, wherein the polyurethane foam is composed of a slab-foamed article.

The invention of item 9 is the polyurethane foam according to any one of items 1 to 8, which is used as a soundproof material for vehicles.

Advantage of the Invention

According to the invention of item 1, since the polyol contains a polyester polyol having one or more side chains composed of an alkyl group and the polyisocyanate contains a diphenylmethane diisocyanate, the polyurethane foam has excellent heat resistance and good strength and is lightweight and easy to handle owing to no impregnation with asphalt, and also there is obtained an effect of becoming inexpensive owing to no use of an expensive raw material.

According to the invention of item 2, it becomes possible to lower the cost by using a polyether polyol in combination.

According to the invention of item 3, the viscosity of the raw material can be decreased and thus the handling ability can be further improved by using tolylene diisocyanate in combination.

According to the invention of item 4, a polyurethane foam having good heat resistance and flame retardancy is obtained by the reaction between a polyester polyol and a diphenylmethane diisocyanate-based isocyanate. Especially, the polyurethane foam can pass a UL-94 vertical combustion test V0 that is difficult to pass for a simple body of a soft polyurethane foam, not only in a normal state (23° C., 50% RH×48 hours) but also after a severe heat aging test through the passage of 150° C.×600 hours.

According to the invention of item 5, since the polyester polyol has one or more side chains composed of an alkyl group, a polyurethane foam also having good moist heat resistance is obtained.

According to the invention of item 6, it becomes possible to lower the cost with suppressing a decrease in physical properties within an allowable range by using a polyether polyol in combination.

According to the invention of item 7, though the elongation of the polyurethane foam decreases when the flame retardant is added in a large amount, the adding amount is a predetermined amount, so that the decrease in the elongation is suppressed, flexibility is not lost at use, and insufficiency in followability to a counterpart item can be prevented in the case where a gap is filled therewith at a space of a vehicle or the like for which soundproofing is required.

According to the invention of item 8, in a slab foam that can be processed into a shape according to a use application, a polyurethane foam having good heat resistance, moisture heat resistance, and flame retardancy is obtained, so that its use application is extended.

Incidentally, a polyurethane foam include a slab foam and a mold foam. The slab foam is formed by slab foaming of injecting a polyurethane foam raw material onto a conveyor and reacting a polyol and a polyisocyanate at ordinary temperature and under atmospheric pressure to continuously foam and shape the reaction product in a semicylindrical form expanded upward and the product is converted into an appropriate size and shape by cutting or the like after foaming.

On the other hand, the mold foam is formed by mold foaming in which a polyurethane raw material is filled into a mold having a product-shaped cavity and is formed into a product shape.

According to the invention of item 9, in the case where the invention of each of items 1 to 3 is applied, a soundproof material for vehicles, which has heat resistance and strength and is lightweight and inexpensive, is obtained and, in the case where the invention each of items 4 to 8 is applied, a soundproof material for vehicles, which has heat resistance, moist heat resistance, and strength and is lightweight, is obtained.

MODES FOR CARRYING OUT THE INVENTION

The polyurethane foam in the first invention is obtained by reacting a polyol and a polyisocyanate, and is foamed and formed from a polyurethane raw material in which the polyol, a foaming agent, a catalyst, a foam stabilizer, the polyisocyanate, and other appropriate auxiliary agent(s) are blended. The density of the polyurethane foam (JIS K7222: 2005) is preferably from 30 to 150 kg/m$^3$.

The polyol to be used in the first invention contains a polyester polyol having one or more side chains composed of an alkyl group, and a polyether polyol may be used in combination. The mass ratio of the polyester polyol having one or more side chains composed of an alkyl group and the polyether polyol is preferably from 100:0 to 30:70, and particularly preferred is single use of the polyester polyol having one or more side chains composed of an alkyl group. Incidentally, with regard to the polyester polyol having one or more side chains composed of an alkyl group, plural kinds thereof may be used in combination. Further, it becomes possible to lower the cost without generation of an extreme decrease in physical properties of the polyurethane foam.

The polyurethane foam in the second invention is obtained from a polyurethane foaming raw material containing a polyol, a polyisocyanate, a catalyst, a foaming agent, and a flame retardant, and has a density (JIS K7222: 2005) of from 80 to 120 kg/m$^3$.

The polyol to be used in the second invention is a polyester polyol, and more preferred is single use of a polyester polyol having one or more side chains composed of an alkyl group. With regard to the polyester polyol having one or more side chains composed of an alkyl group, plural kinds thereof may be used in combination. Incidentally, when a polyether polyol is used singly, oxidative degradation is prone to occur and heat resistance, moist heat resistance, and flame retardancy become poor, but it becomes possible to lower the cost with suppressing the decrease in heat resistance and moist heat resistance by using a polyether polyol in combination together with the polyester polyol having one or more side chains composed of an alkyl group. The blending amount of the polyether polyol is preferably 40 parts by mass or less, more preferably 20 parts by mass or less.

The polyester polyol having one or more side chains composed of an alkyl group to be used in the first invention and the second invention is a polymerization product having an aliphatic branched glycol and an aliphatic dicarboxylic acid as constituting units.

As the above-described aliphatic branched glycol, there may be specifically exemplified 1,2-propylene glycol, 1-methyl-1,3-butylene glycol, 2-methyl-1,3-butylene glycol, neopentyl glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4-dimethylbutylene glycol, and the like. These aliphatic branched glycols are used singly or two or more thereof are used in combination.

Specific examples of the above-described aliphatic dicarboxylic acid include oxalic acid, succinic acid, glutaric acid, adipic acid, sebacic acid and dodecanedioic acid, 1,6-cyclohexanedicarboxylic acid, and the like. Also, derivatives such as lower alkyl esters, acid anhydrides, and the like thereof may be mentioned. These may be used singly or two or more thereof may be used in combination.

Further, preferred is an aliphatic polyester polyol wherein the average molecular weight (number-average molecular weight) of the aliphatic polyester polyol obtained from an aliphatic dibasic acid and an aliphatic branched divalent alcohol is from 1,000 to 5,000 (more preferably from 2,000 to 3,000), which is a polyester polyol having one or more side chains composed of an alkyl group.

Moreover, the number of functional groups is preferably from 2 to 4 for achieving both of flexibility and toughness.

Examples of the polyether polyol to be used in the first invention and the second invention include polyether polyols obtained by adding an alkylene oxide such as ethylene oxide (EO) or propylene oxide (PO) to polyhydric alcohols such as ethylene glycol, diethylene glycol, propylene glycol, dipropylene glycol, butylene glycol, neopentyl glycol, glycerin, pentaerythritol, trimethylolpropane, sorbitol, and sucrose. Particularly, preferred is a polyether polyol whose molecular weight is from 2,000 to 7,000 and whose number of functional groups is from 2 to 6.

As the foaming agent to be used in the first invention and the second invention, water or a hydrocarbon such as pentane may be used singly or in combination. In the case of water, carbon dioxide gas is generated at the time of reaction between the polyol and the polyisocyanate and foaming is achieved by the carbon dioxide gas. The amount of the foaming agent is an appropriate amount but, in the case of water, the amount is preferably from 1.5 to 4.0 parts by mass per 100 parts by mass of the polyol in the first invention and the amount is preferably from 1.0 to 3.5 parts by mass per 100 parts by mass of the polyol in the second invention.

As the catalyst, known one for urethane foam can be used. For example, there may be mentioned amine-based catalysts such as triethylamine and tetramethylguanamine, tin-based catalysts such as stannous octoate, and metal catalysts (also referred to as organometallic catalysts) such as phenylmercury propionate and lead octenoate. A usual amount of the catalyst is from 0.5 to 3.0 parts by mass per 100 parts by mass of the polyol in the first invention and is from 0.1 to 2.0 parts by weight per 100 parts by mass of the polyol in the second invention.

As the flame retardant, either expanded graphite or a phosphorus-based powder flame retardant or both of the powder flame retardants are used.

As the expanded graphite, there can be used known expanded graphite, for example, one obtained by immersing natural graphite in a mixed liquid of sulfuric acid, nitric acid, and the like and adding an oxidizing agent such as hydrogen peroxide or hydrochloric acid. Particularly, preferred is one having an expansion initiation temperature of about 130 to 300° C., an expansion volume of from about 50 to 300 cc/g, and an average particle diameter before expansion of from 50 to 500 µm.

As the phosphorous-based catalyst, there may be mentioned phosphate ester-based flame retardants such as aliphatic phosphate esters, aromatic phosphate esters, aromatic condensed phosphate esters, halogen phosphate esters, and halogen-containing condensed phosphate esters, which are powdery flame retardants. For example, commercially available phosphorus-based powder flame retardants include product names "SH-850", "CR-900", "DAIGUARD-1000", "PX-200", and the like manufactured by Daihachi Chemical Industry Co., Ltd.

As for the expanded graphite and the phosphorus-based flame retardant, either one may be used singly but, for obtaining better heat resistance and moist heat resistance, both ones are preferably used in combination. The adding amount of the flame retardant is preferably 20 parts by mass or more per 100 parts by mass of the polyol. In the case where the adding amount is small, the flame retardant effect becomes poor, while elongation decreases in the case where the adding amount is too large. The adding amount of the flame retardant is more preferably from 20 to 40 parts by mass per 100 parts by mass of the polyol.

Incidentally, a melamine flame retardant is present as a powder flame retardant but, when the melamine flame retardant is used, the resulting polyurethane foam fails to pass the UL-94 vertical combustion test V0 in a normal state (23° C., 50% RH×48 hours) and after a heat aging test through the passage of 150° C.×600 hours.

Further, when a liquid flame retardant is used, the resulting polyurethane foam fails to pass the UL-94 vertical combustion test V0 after a heat aging test through the passage of 150° C.×600 hours.

The polyisocyanate to be used in the first invention contains diphenylmethane diisocyanate (MDI), and tolylene diisocyanate (TDI) may be used in combination. The mass ratio of diphenylmethane diisocyanate to tolylene diisocyanate is preferably from 100:0 to 30:70 and particularly preferred is single use of diphenylmethane diisocyanate (MDI) or polymeric MDI. Incidentally, as diphenylmethane diisocyanate (MDI), plural kinds of monomeric MDI, polymeric MDI, and prepolymers of polymeric MDI may be used in combination. Further, by using tolylene diisocyanate in combination within the above range, handling ability can be further improved though a decrease in viscosity of the polyurethane raw material without generating an extreme decrease in physical properties of the polyurethane foam.

As the diphenylmethane diisocyanate to be used in the first invention, there may be specifically mentioned 2,2'-diphenylmethane diisocyanate (2,2'-MDI), 2,4'-diphenylmethane diisocyanate (2,4'-MDI), 4,4'-diphenylmethane diisocyanate (4,4'-MDI), polymeric MDI that is a mixture of diphenylmethane diisocyanate and polymethylenepolyphenylene polyisocyanate, MDI prepolymers obtained by reacting diphenylmethane diisocyanate with polyols, and the like.

As the tolylene diisocyanate (TDI) to be used in the first invention, there may be mentioned 2,4'-tolylene diisocyanate (2,4'-TDI), 2,6'-tolylene diisocyanate (2,6'-TDI), T-80 (2,4'-TDI/2,6'-TDI=80/20), and T-65 (2,4'-TDI/2,6'-TDI=65/35). Particularly, preferred is T-80 that has been generally widely used.

In the first invention, an isocyanate index is preferably from 90 to 105. When the isocyanate index becomes less than 90, a good foam cannot be formed. On the other hand, when the isocyanate index exceeds 105, the foam becomes too hard and/or a good foam cannot be formed. The isocyanate index is a value obtained by dividing the mol number of the isocyanate group in the polyisocyanate by the total mol number of active hydrogen groups of the hydroxyl groups of the polyol and water as the foaming agent and multiplying the resulting value by 100, and is calculated as follows: [NCO equivalent of polyisocyanate/equivalent of active hydrogen×100].

As the polyisocyanate to be used in the second invention, a diphenylmethane diisocyanate-based isocyanate is used singly. As the diphenylmethane diisocyanate-based isocyanate, plural kinds of monomeric MDI (pure MDI), polymeric MDI, and prepolymers of polymeric MDI may be used in combination.

As the diphenylmethane diisocyanate-based isocyanate to be used in the second invention, there may be specifically mentioned the same ones as the diphenylmethane diisocyanate to be used in the first invention.

In the second invention, the isocyanate index is preferably from 85 to 115. When the isocyanate index becomes less than 85, a good foam cannot be formed. On the other hand, when the isocyanate index exceeds 115, the foam becomes too hard and/or a good foam cannot be formed.

As the auxiliary agents to be added appropriately, a foam stabilizer, an antioxidant, a colorant, and the like may be mentioned.

As the foam stabilizer, known one for urethane foam can be used. For example, there may be mentioned silicone-based foam stabilizers, fluorine-containing compound-based foam stabilizers, and known surfactants. A usual amount of the foam stabilizer is from 0.5 to 3.0 parts by mass per 100 parts by mass of the polyol in the first invention and is from 0.1 to 3.0 parts by mass per 100 parts by mass of the polyol in the second invention.

As the antioxidant to be used in the first invention and the second invention, phenol-based, phosphorus-based, and diphenylamine-based ones may be mentioned. Particularly, preferred is use of either one of the phosphorus-based antioxidant and the diphenylamine-based antioxidant or combined use thereof. The amount of the antioxidant is preferably from 0.5 to 3 parts by mass per 100 parts by mass of the polyol.

The density of the polyurethane foam (JIS K7222:2005) is preferably from 80 to 120 kg/m$^3$. When the density lowers, the flame retardancy decreases, while the weight increases to limit its use application and also the cost increases when the density becomes high.

Further, the polyurethane foam of the invention may be either a slab foam or a mold foam but is preferably a slab foam.

The slab foaming is a method of injecting a polyurethane foam raw material onto a conveyor and reacting a polyol and a polyisocyanate at ordinary temperature and under atmospheric pressure to continuously foam and shape the reaction product in a semicylindrical form expanded upward and thereafter, the product is cut into an appropriate size.

On the other hand, the mold foaming is a method of filling the polyurethane raw material into a mold and foaming it into a product shape.

The polyurethane foam of the invention is used singly or is used after it is laminated on a metal plate, a plastic plate, or the like. The polyurethane foam of the invention can be used in a wide range of fields. Particularly, since the polyurethane foam of the invention has good heat resistance, moist heat resistance, and flame retardancy, it can be used as a sound absorbing material, a cushion material, or a sealing material.

Moreover, in the case where it is used as a soundproof material for vehicles, it is suitable for a member for which heat resistance and the like are required. For example, it is suitable for use applications such as a soundproof sheet of rear face of an engine hood, an engine cover, a hood silencer, a dush silencer, a side cover, and an undercover, and it is suitable as an intermediate material constituting them.

Particularly, the engine cover is a casing that covers an upper face of an engine. Further, the engine undercover is provided at the bottom part of the engine, so that dust and moisture may not enter the engine room and also a cooling air that passes through the engine room may smoothly passes through. Thereby, a risk of overheat is reduced.

These cover members are used after a sound absorbing material composed of the polyurethane foam of the invention is adhered and/or attached to a substrate that is a rigid member made of a metal or a resin. Therefore, it is necessary for the sound absorbing material to be shaped so that the material can follow a complex shape of the substrate.

The soft polyurethane slab foam of the invention is used as a sound absorbing material and is lighter in weight than a glass wool.

The sound absorbing material provided at the engine room is disposed in the periphery or vicinity of the engine of an automobile and heat resistance, moist heat resistance, flame retardancy, and lightness in weight are required. In the engine room, since there are an engine, intake and exhaust tubes, and a cooling device and the room becomes high temperature, heat resistance is required. Further, water resistance and moist heat resistance are also required at the time of driving a vehicle in the rain and washing the vehicle and at the time of washing the inside of the engine.

The foam of the invention is lightweight and has good heat resistance, moist heat resistance, and flame retardancy, so that the form is suitable for these use applications.

Since an upper engine cover has a concave-convex shape, it is also necessary for the slab foam of the invention to have a property capable of performing hot-press molding beforehand. Further, since a substrate of the engine cover is made of a resin, the substrate is shaped into a complex shape for covering the engine. Therefore, in order to attach the sound absorbing material of the invention to the substrate, the sound absorbing material is shaped into the above complex shape beforehand.

The polyurethane foam of the invention is capable of performing concave-convex processing by cutting processes. Moreover, in view of shaping into a complex shape and processing costs, hot-press processing is preferred for the concave-convex processing and shaping. It is possible to shape the foam into a concave-convex shape by heating and compressing it at 180° C. to 230° C. for 1 to 5 minutes.

Further, a fibrous nonwoven fabric or woven fabric may be laminated on one face or both faces of a sound absorbing material composed of the polyurethane foam of the invention. Thereby, rigidity can be increased as compared with the polyurethane foam alone, and degradation can be prevented owing to the weather resistance to increase durability.

Moreover, when a water repellent is applied to the fibrous nonwoven fabric, the laminated sound absorbing material has improved water resistance.

The polyurethane foam sheet and the fibrous nonwoven fabric can be attached and laminated to each other using an adhesive. When a nonwoven fabric is laminated to the polyurethane foam and then hot-press is performed, the concave-convex shape can be formed simultaneously with the attachment, so that the case is preferable.

Specifically, explanation will be performed with regard to the sound absorbing material to be attached to the rear side of the engine upper cover.

A soft polyurethane slab foam of each of Examples and Comparative Examples shown in Tables 3 and 4 was sliced into a sheet form to have a plane size of 500×500 mm and then heated and compressed in the above hot-press mold at 205° C. for 3 minutes, thereby producing a sound absorbing material having a predetermined concave-convex shape.

By the processing, it was possible to transform the polyurethane foam having excellent heat resistance, moist heat resistance, and flame retardancy into a shape suitable as a sound absorbing material for an engine room.

As a method of laminating the sound absorbing material composed of the polyurethane foam to the above substrate or nonwoven fabric, it is possible to adhere them using a usual adhesive, heat resistant-adhesive, or the like.

As the adhesive, it is possible to use a chloroprene rubber-based adhesive, a nitrile rubber-based adhesive, a reactive urethane hot melt-based adhesive, or a heat resistant adhesive. Particularly, as the heat resistant adhesive, there may be mentioned an acrylic adhesive, a silicone-based adhesive, a silica-based adhesive, and the like without particular limitation. Of these, the silica-based adhesive is preferred.

EXAMPLES

Examples and Comparative Examples of First Invention

A polyurethane raw material prepared into the blend shown in each of Tables 1 and 2 was mixed in a mixer, charged into a foaming mold of 400×400×40 mm, and foamed to produce a polyurethane foam of each of Examples and Comparative Examples of the first invention.

Polyester polyol-1: poly(3-methyl-1,5-pentanediol; trimethylolpropane)alt-adipic acid, molecular weight:3,000, number of functional groups: 3

Polyester polyol-2: poly(neopentyl glycol; trimethylolpropane)alt-adipic acid, molecular weight:3,000, number of functional groups: 3

Polyester polyol-3: poly(diethylene glycol/trimethylolpropane)alt-adipic acid, molecular weight:2,400, number of functional groups: 2.6

Polyether polyol: polyoxyethylene/oxypropylene ether polyol, molecular weight:3,000, number of functional groups: 3, Foaming agent: water Catalyst: triethylenediamine Foam stabilizer: special nonionic surfactant, BJ-100 (manufactured by Kao Corporation)

MDI-1: polymeric MDI, polymethylenepolyphenyl polyisocyanate

MDI-2: urethane-modified MDI prepolymer, NCO %: 28.5

TDI: T-80

TABLE 1

|  |  | Example | | | | | | |
|---|---|---|---|---|---|---|---|---|
|  |  | 1-1 | 1-2 | 1-3 | 1-4 | 1-5 | 1-6 | 1-7 |
| Polyester polyol 1 | parts by mass | 100 | 100 |  | 30 | 30 |  | 30 |
|  | % by mass in polyol | 100% | 100% |  | 30% | 30% |  | 30% |
| Polyester polyol 2 | parts by mass |  |  | 100 |  |  | 30 |  |
|  | % by mass in polyol |  |  | 100% |  |  | 30% |  |
| Polyester polyol 3 | parts by mass |  |  |  |  |  |  |  |
|  | % by mass in polyol |  |  |  |  |  |  |  |
| Polyether polyol | parts by mass |  |  |  | 70 | 70 | 70 | 70 |
|  | % by mass in polyol |  |  |  | 70% | 70% | 70% | 70% |
| Foaming agent | parts by mass | 1.5 | 1.5 | 1.5 | 1.5 | 1.5 | 1.5 | 1.5 |
| Catalyst | parts by mass | 0.6 | 0.6 | 0.6 | 0.6 | 0.6 | 0.6 | 0.6 |
| Foam stabilizer | parts by mass | 1.0 | 1.0 | 1.0 | 1.0 | 1.0 | 1.0 | 1.0 |
| MDI-1 | parts by mass | 36.9 |  | 36.9 | 36.9 |  | 36.9 | 8.1 |
|  | % by mass in polyisocyanate | 100% |  | 100% | 100% |  | 100% | 30% |
| MDI-2 | parts by mass |  | 40.8 |  |  | 40.8 |  |  |
|  | % by mass in polyisocyanate |  | 100% |  |  | 100% |  |  |
| TDI | parts by mass |  |  |  |  |  |  | 18.9 |
|  | % by mass in polyisocyanate |  |  |  |  |  |  | 70% |
| Isocyanate index |  | 100 | 100 | 100 | 100 | 100 | 100 | 100 |
| Retention of tensile strength | % | 82.0 | 109.1 | 83.5 | 71.0 | 89.2 | 70.6 | 62.1 |

TABLE 2

(parts by mass)

|  |  | Comparative Example | | | | | | |
|---|---|---|---|---|---|---|---|---|
|  |  | 1-1 | 1-2 | 1-3 | 1-4 | 1-5 | 1-6 | 1-7 |
| Polyester polyol 1 | parts by mass | 100 |  |  | 100 | 20 |  |  |
|  | % by mass in polyol | 100% |  |  | 100% | 20% |  |  |
| Polyester polyol 2 | parts by mass |  |  |  |  |  |  |  |
|  | % by mass in polyol |  |  |  |  |  |  |  |
| Polyester polyol 3 | parts by mass |  | 100 | 100 |  |  |  |  |
|  | % by mass in polyol |  | 100% | 100% |  |  |  |  |
| Polyether polyol | parts by mass |  |  |  |  | 80 | 100 | 100 |
|  | % by mass in polyol |  |  |  |  | 80% | 100% | 100% |

TABLE 2-continued

| | | Comparative Example (parts by mass) | | | | | | |
|---|---|---|---|---|---|---|---|---|
| | | 1-1 | 1-2 | 1-3 | 1-4 | 1-5 | 1-6 | 1-7 |
| Foaming agent | parts by mass | 1.5 | 1.5 | 1.5 | 1.5 | 1.5 | 1.5 | 1.5 |
| Catalyst | parts by mass | 0.6 | 0.6 | 0.6 | 0.6 | 0.6 | 0.6 | 0.6 |
| Foam stabilizer | parts by mass | 1.0 | 1.0 | 1.0 | 1.0 | 1.0 | 1.0 | 1.0 |
| MDI-1 | parts by mass | | 38.0 | | 5.2 | 36.9 | 36.9 | |
| | % by mass in polyisocyanate | | 100% | | 20% | 100% | 100% | |
| MDI-2 | parts by mass | | | | | | | |
| | % by mass in polyisocyanate | | | | | | | |
| TDI | parts by mass | 24.1 | | 24.8 | 20.7 | | | 24.1 |
| | % by mass in polyisocyanate | 100% | | 100% | 80% | | | 100% |
| Isocyanate index | | 100 | 100 | 100 | 100 | 100 | 100 | 100 |
| Retention of tensile strength | % | 47.8 | 48.4 | 29.5 | 53.5 | 52.6 | 15.6 | 16.0 |

Examples 1-1 and 1-2 are examples in which the polyester polyol 1 having one or more side chains composed of an alkyl group was used alone as for a polyol. As for a polyisocyanate, Example 1-1 is an example in which polymeric MDI alone was used and Example 1-2 is an example in which MDI prepolymer alone was used.

Example 1-3 is an example in which the polyester polyol 2 having one or more side chains composed of an alkyl group was used alone as for a polyol and polymeric MDI alone was used as for a polyisocyanate.

Examples 1-4 and 1-5 are examples in which 30 parts by mass (30% by mass in polyol) of the polyester polyol 1 having one or more side chains composed of an alkyl group and 70 parts by mass (70% by mass in polyol) of the polyether polyol were used in combination as for a polyol. As for a polyisocyanate, Example 1-4 is an example in which polymeric MDI alone was used and Example 1-5 is an example in which MDI prepolymer alone was used.

Examples 1-6 is an example in which, as for a polyol, 30 parts by mass (30% by mass in polyol) of the polyester polyol 2 having one or more side chains composed of an alkyl group and 70 parts by mass (70% by mass in polyol) of the polyether polyol were used in combination and, as for a polyisocyanate, polymeric MDI alone was used.

Examples 1-7 is an example in which, as for a polyol, 30 parts by mass (30% by mass in polyol) of the polyester polyol 1 having one or more side chains composed of an alkyl group and 70 parts by mass (70% by mass in polyol) of the polyether polyol were used in combination and, as for a polyisocyanate, 30% by mass in the polyisocyanate was polymeric MDI and 70% by mass therein was T-80.

Comparative Example 1-1 is an example in which, as for a polyol, the polyester polyol 1 having one or more side chains composed of an alkyl group was used alone and, as for a polyisocyanate, T-80 alone was used.

Comparative Examples 1-2 and 1-3 are examples in which, as for a polyol, the polyester polyol 3 having no side chain composed of an alkyl group was used alone and, as for a polyisocyanate, polymeric MDI alone was used in Comparative Example 1-2 and T-80 alone was used in Comparative Example 1-3, thus differentiating these examples from each other.

Comparative Examples 1-4 is an example in which, as for a polyol, the polyester polyol 1 having one or more side chains composed of an alkyl group was used alone and, as for a polyisocyanate, 20% by mass in the polyisocyanate was polymeric MDI and 80% by mass therein was T-80.

Comparative Examples 1-5 is an example in which, as for a polyol, 20 parts by mass (20% by mass in the polyol) of the polyester polyol 1 having one or more side chains composed of an alkyl group and 80 parts by mass (80% by mass in the polyol) of the polyether polyol were used in combination and, as for a polyisocyanate, polymeric MDI alone was used.

Comparative Examples 1-6 and 1-7 are examples in which, as for a polyol, the polyether polyol was used alone and, as for a polyisocyanate, polymeric MDI alone was used in Comparative Example 1-6 and T-80 alone was used in Comparative Example 1-7.

Heat resistance was measured for the polyurethane foam of each of Examples and Comparative Examples. For the measurement of the heat resistance, after tensile strength was measured according to JIS K6400 for the polyurethane foam of each of Examples and Comparative Examples, it was accommodated in a thermostatic chamber and heated at 150° C. for 600 hours and thereafter tensile strength was measured according to JIS K6400. Using the measured tensile strength before heating and the tensile strength after heating, retention (%) of the tensile strength was calculated according to the formula: [Tensile strength after heating÷Tensile strength before heating×100]. The following was judged: the larger the retention of the tensile strength is, the better the heat resistance is. The results are shown at the bottom part of Tables 1 and 2.

From Tables 1 and 2, the polyurethane foams of Examples 1-1 to 1-7 had larger retention of the tensile strength than those of Comparative Examples 1-1 to 1-7 had, and thus had excellent heat resistance. Further, with regard to the polyols, from the comparison between Example 1-1 and Example 1-4 and the comparison between Example 1-2 and Example 1-5, it is understood that the single use of the polyester polyol having one or more side chains composed of an alkyl group can increase the heat resistance as compared with the combined use of the polyester polyol having one or more side chains composed of an alkyl group and the polyether polyol. On the other hand, as for the polyisocyanates, from the comparison between Example 1-4 and Example 1-7, it is understood that the single use of MDI can increase the heat resistance as compared with the combined use of MDI and TDI.

Examples and Comparative Examples with Regard to Second Invention

A polyurethane raw material prepared into a blend shown in each of Tables 3 and 4 was mixed in a mixer and subjected to slab foaming to produce a polyurethane foam of each of Examples and Comparative Examples of the second invention.

Polyester polyol: poly(3-methyl-1,5-pentanediol; trimethylolpropane)alt-adipic acid, molecular weight:3,000, number of functional groups: 3, product name "Polylite OD-X-2518" (manufactured by Dainippon Ink and Chemicals Corporation)

Polyether polyol: molecular weight:3,000, number of functional groups: 3, product name "SANNIX GP-3050NS" (manufactured by Sanyo Chemical Industries, Ltd.)

Foaming agent: water

Catalyst: triethylenediamine

Foam stabilizer: silicone foam stabilizer, product name "BJ-100" (manufactured by Kao Corporation)

Isocyanate (MDI): polymeric MDI, polymethylenepolyphenyl polyisocyanate, product name "Foamlite 2803B" (manufactured by BASF INOAC Polyurethanes Ltd.)

Isocyanate (TDI): T-80

Expanded graphite: product name "SYZR 502FP" (manufactured by Sanyo Trading Co., Ltd.), expansion starting temperature: 180° C. to 200° C.

Phosphorus-based powder flame retardant: product name "SH-850" (manufactured by Daihachi Chemical Industry Co., Ltd.)

Melamine: product name "Melamine" manufactured by Mitsui Chemicals, Inc., melting point: 345° C. or higher, flash point: 287° C.

Liquid flame retardant 1: halogen-containing condensed phosphate ester, product name "CR504L" (manufactured by Daihachi Chemical Industry Co., Ltd.), flash point: 236° C.

Liquid flame retardant 2: non-halogen phosphate ester, product name "DAIGUARD-880" (manufactured by Daihachi Chemical Industry Co., Ltd.), flash point: 217° C., decomposition temperature: 251° C.

TABLE 3

| | Example (parts by mass) | | | | | | |
|---|---|---|---|---|---|---|---|
| | 2-1 | 2-2 | 2-3 | 2-4 | 2-5 | 2-6 | 2-7 |
| Polyester polyol | 100 | 100 | 100 | 100 | 100 | 80 | 60 |
| Polyether polyol | | | | | | 20 | 40 |
| Water | 1.8 | 1.8 | 1.8 | 1.8 | 1.8 | 2.1 | 2.4 |
| Catalyst | 0.5 | 0.5 | 0.5 | 0.5 | 0.5 | 1.5 | 0.6 |
| Foam stabilizer | 0.5 | 0.5 | 0.5 | 0.5 | 0.5 | 0.5 | 0.5 |
| Isocyanate: MDI | 50.4 | 50.4 | 50.4 | 50.4 | 50.4 | 53.0 | 57.3 |
| Isocyanate INDEX | 100 | 100 | 100 | 100 | 100 | 100 | 100 |
| Expanded graphite | 10 | 20 | 20 | | 25 | 10 | 10 |
| Phosphorus-based powder flame retardant | 10 | 20 | | 20 | 25 | 10 | 10 |
| Melamine | | | | | | | |
| Liquid flame retardant 1 | | | | | | | |
| Liquid flame retardant 2 | | | | | | | |
| Physical properties | | | | | | | |
| Foam density kg/m3 | 112.3 | 105.6 | 119.1 | 110.6 | 109.2 | 94.1 | 88.7 |
| Heat resistance | | | | | | | |
| Tensile strength (kPa) after 150° C. × 600 h | 294 (◯) | 296 (◯) | 217 (◯) | 252 (◯) | 223 (◯) | 145 (◯) | 168 (◯) |
| Elongation (%) after 150° C. × 600 h | 33 (◯) | 20 (◯) | 27 (◯) | 23 (◯) | 8 (X) | 26 (◯) | 12 (X) |
| Moist heat resistance | | | | | | | |
| Tensile strength (kPa) after 80° C. × 95% RH × 600 h | 92 (◯) | 102 (◯) | 92 (◯) | 102 (◯) | 89 (Δ) | 131 (◯) | 190 (◯) |
| Elongation (%) after 80° C. × 95% RH × 600 h | 47 (◯) | 33 (◯) | 30 (◯) | 33 (◯) | 13 (X) | 32 (◯) | 26 (◯) |
| Flame retardancy | | | | | | | |
| UL-94 V0 combustion test in a normal state | passed | passed | passed | passed | passed | passed | passed |
| UL-94 V0 combustion test after hot aging of 150° C. × 600 h | passed | passed | passed | passed | passed | passed | passed |

TABLE 4

| | Comparative Example (parts by mass) | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Polyester polyol | 100 | 100 | 100 | 100 | 100 | | 100 | 100 | 100 |
| Polyether polyol | | | | | | 100 | | | |
| Water | 1.8 | 1.8 | 1.8 | 1.8 | 2.4 | 3.8 | 1.8 | 1.8 | 1.8 |

TABLE 4-continued (parts by mass)

| | Comparative Example | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| Catalyst | 0.5 | 0.5 | 0.5 | 0.5 | 0.7 | 0.1 | 0.5 | 0.5 | 0.5 |
| Foam stabilizer | 0.5 | 0.5 | 0.5 | 0.5 | 1.2 | 0.8 | 0.5 | 0.5 | 0.5 |
| Isocyanate: MDI | 50.4 | 50.4 | 50.4 | 50.4 | | | 50.4 | 50.4 | 50.4 |
| Isocyanate: TDI | | | | | 31.9 | 47.6 | | | |
| Isocyanate INDEX | 100 | 100 | 100 | 100 | 100 | 100 | 100 | 100 | 100 |
| Expanded graphite | | | | | | | | 5 | 10 |
| Phosphorus-based powder flame retardant | | | | | | | | 5 | 10 |
| Melamine | 20 | | | | | | | | |
| Liquid flame retardant 1 | | 20 | | | | | | | |
| Liquid flame retardant 2 | | | 20 | | | | | | |
| Physical properties | | | | | | | | | |
| Foam density kg/m3 | 113.3 | 115.5 | 110.0 | 108.2 | 35.4 | 24.7 | 107.4 | 110.5 | 112.1 |
| Heat resistance | | | | | | | | | |
| Tensile strength (kPa) after 150° C. × 600 h | 248 (○) | 299 (○) | 306 (○) | 182 (○) | 70 (Δ) | 23 (X) | 293 (○) | 301 (○) | 298 (○) |
| Elongation (%) after 150° C. × 600 h | 23 (○) | 20 (○) | 26 (○) | 55 (○) | 77 (○) | 41 (○) | 42 (○) | 35 (○) | 38 (○) |
| Moist heat resistance | | | | | | | | | |
| Tensile strength (kPa) after 80° C. × 95% RH × 600 h | 89 (Δ) | 40 (X) | 29 (X) | 116 (○) | *1 | 95 (○) | 111 (○) | 105 (○) | 113 (○) |
| Elongation (%) after 80° C. × 95% RH × 600 h | 32 (○) | 13 (X) | 18 (Δ) | 64 (○) | *1 | 161 (○) | 45 (○) | 38 (○) | 40 (○) |
| Flame retardancy | | | | | | | | | |
| UL-94 V0 combustion test in a normal state | failed | passed | passed | failed | failed | failed | failed | failed | failed |
| UL-94 V0 combustion test after hot aging of 150° C. × 600 h | failed | failed | failed | failed | failed | failed | failed | failed | failed |

*1 degradatively decomposed and impossible to measure

Examples 2-1 and 2-1 are examples in which expanded graphite and the phosphorus-based powder flame retardant were used in combination as flame retardants and the adding amounts thereof were changed, Example 2-3 is an example in which expanded graphite was used alone as a flame retardant, Example 2-4 is an example in which the phosphorus-based powder flame retardant was used alone as a flame retardant, and Example 2-5 is an example in which expanded graphite and the phosphorus-based powder flame retardant were used as flame retardants and the amounts of the flame retardants were increased. Examples 2-6 and 2-7 are examples in which the polyester polyol and the polyether polyol were used in combination and 20 parts by mass of the polyether polyol in Example 2-6 and 40 parts by mass of the polyether polyol in Example 2-7 were used.

Comparative Example 2-1 is an example in which melamine was used alone as a flame retardant, Comparative example 2-2 is an example in which the liquid flame retardant 1 was used alone as a flame retardant, and Comparative example 2-3 is an example in which the liquid flame retardant 2 was used alone as a flame retardant.

Comparative example 2-4 is an example in which no flame retardant was added and the isocyanate was MDI that was the same as in Examples, and Comparative example 2-5 is an example in which no flame retardant was added and the isocyanate was changed to TDI. Comparative example 2-6 is an example in which the polyether polyol was used alone as a polyol, also no flame retardant was added, and TDI was used as an isocyanate.

Comparative example 2-7 is an example in which expanded graphite and the phosphorus-based powder flame retardant as flame retardants were used in smaller amounts than the range of the present invention. Comparative example 2-8 is an example in which expanded graphite was used alone as a flame retardant and the adding amount was smaller than the range of the invention, and Comparative example 2-9 is an example in which the phosphorus-based powder flame retardant was used alone as a flame retardant and the adding amount was smaller than the range of the invention.

For the polyurethane foam of each of the above Examples and Comparative Examples, density, heat resistance, moist heat resistance, and flame retardancy were measured. The measurement results are shown in the middle columns and lower columns of Tables 3 and 4.

The density was measured based on JIS K7222:2005.

The heat resistance is judged depending on the tensile strength and elongation measured after a test specimen is accommodated in a thermostatic chamber and maintained at 150° C. for 600 hours (measured in accordance with the measurement method of the tensile strength and elongation in a normal state (JIS K6400-5 5)), mainly being judged based on the tensile strength alone, more preferably being judged also with considering the elongation. That is, it can be judged that the heat resistance is poor (x) when the tensile strength in heat resistance is less than 68 kPa, the heat resistance is preferable (Δ) when it is 68 kPa or more and less than 90 kPa, and more preferably, the heat resistance is excellent when it is 90 kPa or more (○). It can be judged that the elongation in heat resistance is low (x) when it is less than 15%, is good (Δ) when it is 15% or more and less than 20%, and is excellent (○) when it is 20% or more.

The moist heat resistance was judged depending on the tensile strength and elongation measured after a test specimen is accommodated in a thermostatic chamber and maintained at 80° C. under a humidity of 95% for 600 hours (measured in accordance with the measurement method of the tensile strength and elongation in a normal state (JIS K6400-55)), mainly being judged based on the tensile strength alone, more preferably being judged also with considering the elongation. That is, it can be judged that the moist heat resistance is poor (x) when the tensile strength for moist heat resistance is less than 68 kPa, the moist heat resistance is preferable (Δ) when it is 68 kPa or more and less than 90 kPa, and more preferably, the moist heat resistance is excellent when it is 90 kPa or more (○). It can be judged that the elongation for moist heat resistance is low (x) when it is less than 15%, is good (Δ) when it is 15% or more and less than 20%, and is excellent (○) when it is 20% or more.

The flame retardancy was judged depending on a UL-94 vertical combustion test V0 in a normal state (23° C., 50% RH×after 48 hours passage) and a UL-94 vertical combustion test V0 after hot aging test through 150° C.×600 hours passage. The test method and judgment are based on the UL-94 vertical combustion tests.

Examples 2-1 to 2-7 all had good heat resistance and moist heat resistance and passed the UL-94 vertical combustion tests in a normal state and after the hot aging, so that they were excellent in flame retardancy. Particularly, in Examples in which 100 parts by mass of the polyester polyol is used, when Example 2-1 in which expanded graphite and the phosphorus-based powder flame retardant are used in combination as flame retardants is compared with Example 2-3 in which expanded graphite is used alone and Example 2-4 in which the phosphorus-based powder flame retardant is used alone, Example 2-1 in which expanded graphite and the phosphorus-based powder flame retardant are used in combination shows better heat resistance and moist heat resistance than Example 2-3 in which expanded graphite is used alone and Example 2-4 in which the phosphorus-based powder flame retardant is used alone show, so that it is preferable to use expanded graphite and the phosphorus-based powder flame retardant in combination. Incidentally, in Example 2-5 in which the adding amount of the flame retardant is large, the measured value of the elongation that is secondarily utilized for the judgment of the heat resistance and moist heat resistance showed a lower value than other Examples 2-1 to 2-4 showed. Further, Examples 2-6 and 2-7 in which the polyester polyol and the polyether polyol are used in combination had slightly lower heat resistance as compared with Example 2-1 in which 100 parts by mass of the polyester polyol is used, but still had sufficiently good heat resistance.

Next, the test results of Comparative Examples 2-1 to 2-9 will be shown.

Comparative example 2-1 is an example in which melamine is used alone as a flame retardant. The example failed to pass the UL-94 vertical combustion test V0 both in a normal state and after hot aging and thus had poor flame retardancy.

Comparative Examples 2-2 and 2-3 are an example in which the liquid flame retardant 1 is used alone as a flame retardant and an example in which the liquid flame retardant 2 is used alone. The both examples failed to pass the UL94 vertical combustion test V0 after hot aging and thus had poor moist heat resistance (tensile strength, elongation).

Comparative example 2-4 is an example in which no flame retardant is added. The example failed to pass the UL94 vertical combustion test V0 both in a normal state and after hot aging and thus had poor flame retardancy.

Comparative example 2-5 is an example in which no flame retardant was added and TDI was used as an isocyanate. The example failed to pass the UL94 vertical combustion test V0 both in a normal state and after hot aging and thus had poor flame retardancy.

Comparative example 2-6 is an example in which the polyether polyol was used as a polyol, no flame retardant was added, and TDI was used as an isocyanate. The example failed to pass the UL94 vertical combustion test V0 both in a normal state and after hot aging and thus had poor flame retardancy. Further, the heat resistance (tensile strength) was poor.

Comparative example 2-7 is an example in which the amount of the flame retardant was made smaller than the range of the present invention. The example failed to pass the UL94 vertical combustion test V0 both in a normal state and after hot aging and thus had poor flame retardancy.

Comparative example 2-8 is an example in which expanded graphite was used alone as a flame retardant and the adding amount thereof was made smaller than the range of the present invention and Comparative example 2-9 is an example in which the phosphorus-based powder flame retardant was used alone as a flame retardant and the amount thereof was made smaller than the range of the present invention. The examples failed to pass the UL94 vertical combustion test V0 both in a normal state and after hot aging and thus had poor flame retardancy.

Thus, the polyurethane foams of the second invention have good heat resistance, moist heat resistance, and flame retardancy, and can be used in various fields for which the heat resistance, moist heat resistance, and flame retardancy are required.

While the invention has been described in detail and with reference to specific embodiments thereof, it will be apparent to one skilled in the art that various changes and modifications can be made therein without departing from the spirit and scope thereof.

The present application is based on Japanese Patent Application No. 2014-104907 filed on May 21, 2014, Japanese Patent Application No. 2015-057921 filed on Mar. 20, 2015, and Japanese Patent Application No. 2015-130667 filed on Jun. 30, 2015, and the contents are incorporated herein by reference. Also, all the references cited herein are incorporated as a whole.

The invention claimed is:

1. A flexible polyurethane foam obtained from a polyurethane foaming raw material containing a polyol, a polyisocyanate, a foaming agent, a catalyst, and a flame retardant, wherein
the polyol contains a polyester polyol,
the polyisocyanate is a diphenylmethane diisocyanate-based isocyanate,
the flame retardant is composed of any one or both of powder flame retardants of expanded graphite and a phosphorus-based powder flame retardant and the adding amount is 20 parts by mass or more per 100 parts by mass of the polyol,
the flexible polyurethane foam has an isocyanate index of from 85 to 115,
the polyester polyol is a polymerization product having an aliphatic branched glycol and an aliphatic dicarboxylic acid as constituting units, and
the flexible polyurethane foam satisfies the following conditions:
(1) a mass ratio of the polyester polyol and a polyether polyol is from 100:0 to 80:20; and
(2) the flexible polyurethane foam has a density (JIS K7222:2005) of from 80 to 94.188.7 kg/m3.

2. The flexible polyurethane foam according to claim 1, wherein the polyester polyol has one or more side chains composed of an alkyl group.

3. The flexible polyurethane foam according to claim 1, wherein the polyol contains a polyester polyol having one or more side chains composed of an alkyl group and a polyether polyol.

4. The flexible polyurethane foam according to claim 1, wherein the flexible polyurethane foam is composed of a slab-foamed article.

5. A vehicle comprising the flexible polyurethane foam according to claim 1 in an engine room.

6. A vehicle comprising a flexible polyurethane foam in an engine room, wherein
the flexible polyurethane foam is obtained from a polyurethane foaming raw material containing a polyol, a polyisocyanate, a foaming agent, a catalyst, and a flame retardant,
the polyol contains a polyester polyol,
the polyisocyanate is a diphenylmethane diisocyanate-based isocyanate,
the flame retardant is composed of any one or both of powder flame retardants of expanded graphite and a phosphorus-based powder flame retardant and the adding amount is 20 parts by mass or more per 100 parts by mass of the polyol,
the flexible polyurethane foam has an isocyanate index of from 85 to 115,
the polyester polyol is a polymerization product having an aliphatic branched glycol and an aliphatic dicarboxylic acid as constituting units,
the flexible polyurethane foam satisfies the following conditions:
(1) a mass ratio of the polyester polyol and a polyether polyol is from 100:0 to 80:20; and
(2) the flexible polyurethane foam has a density (JIS K7222:2005) of from 80 to 88.7 kg/m$^3$, and
the flexible polyurethane foam satisfies any one of the following conditions:
(3) the flexible polyurethane foam has an isocyanate index of from 100 to 115;
(4) the flame retardant is composed of both of powder flame retardants of expanded graphite and a phosphorus-based powder flame retardant, and
(5) the adding amount of the flame retardant is 20 parts by mass or more and 40 parts by mass or less per 100 parts by mass of the polyol.

7. The vehicle according to claim 6, wherein the polyester polyol has one or more side chains composed of an alkyl group.

8. The vehicle according to claim 6, wherein the polyol contains a polyester polyol having one or more side chains composed of an alkyl group and a polyether polyol.

9. The vehicle according to claim 6, wherein the flexible polyurethane foam is composed of a slab-foamed article.

* * * * *